United States Patent
Hirsch

(10) Patent No.: US 8,771,858 B2
(45) Date of Patent: Jul. 8, 2014

(54) COOLING DEVICE FOR A BATTERY MODULE

(75) Inventor: Stefan Hirsch, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 0 days.

(21) Appl. No.: 13/523,314

(22) Filed: Jun. 14, 2012

(65) Prior Publication Data

US 2012/0301772 A1 Nov. 29, 2012

Related U.S. Application Data

(63) Continuation of application No. PCT/EP2010/068861, filed on Dec. 3, 2010.

(30) Foreign Application Priority Data

Dec. 14, 2009 (DE) .......................... 10 2009 058 070

(51) Int. Cl.
 *H01M 10/50* (2006.01)
(52) U.S. Cl.
 USPC ............... 429/120; 429/96; 429/97; 429/98; 429/99; 429/100; 429/158; 429/159
(58) Field of Classification Search
 None
 See application file for complete search history.

(56) References Cited

U.S. PATENT DOCUMENTS

| 7,919,203 B2* | 4/2011 | Shibuya et al. ................. 429/99 |
| 2010/0062321 A1 | 3/2010 | Nakamura |
| 2011/0033736 A1 | 2/2011 | Meintschel et al. |
| 2011/0132580 A1 | 6/2011 | Herrmann et al. |

FOREIGN PATENT DOCUMENTS

| DE | 10 2006 059 989 A1 | 6/2008 |
| DE | 10 2007 063 179 A1 | 6/2009 |
| DE | 10 2008 010 839 A1 | 8/2009 |
| DE | 10 2008 027 293 A1 | 12/2009 |
| WO | WO 2008/050719 A1 | 5/2008 |

OTHER PUBLICATIONS

WO2009103464 (a raw machine translation).*
Jens et al. (WO2009103464) (a raw machine translation) (Aug. 27, 2009) (copy provided in previous Office Action).*

* cited by examiner

*Primary Examiner* — Milton I Cano
*Assistant Examiner* — Carmen Lyles-Irving
(74) *Attorney, Agent, or Firm* — Muncy, Geissler, Olds & Lowe, P.C.

(57) ABSTRACT

A cooling device for a battery module and a battery device comprising said cooling device for a battery module are provided that includes a cooling element having at least one through hole extending from a first side of the cooling element facing the battery module to an opposite second side of the cooling element, at least one spring element disposed on the second side of the cooling element, in order to exert a contact force on the second side of the cooling element in a tensioned condition, and at least one clamping device coupled to the spring element and extending through the through hole, wherein a contact region of the clamping device extends beyond the second side of the cooling element when the spring element is in a relaxed condition.

10 Claims, 9 Drawing Sheets

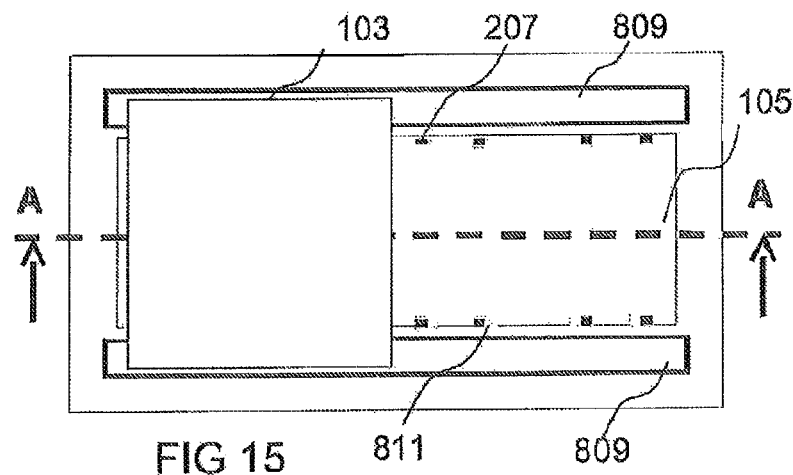
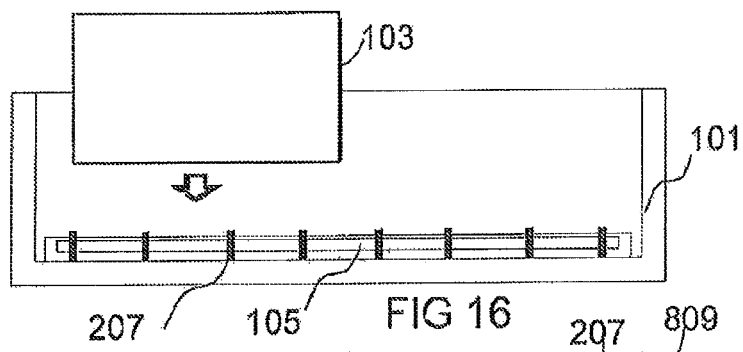
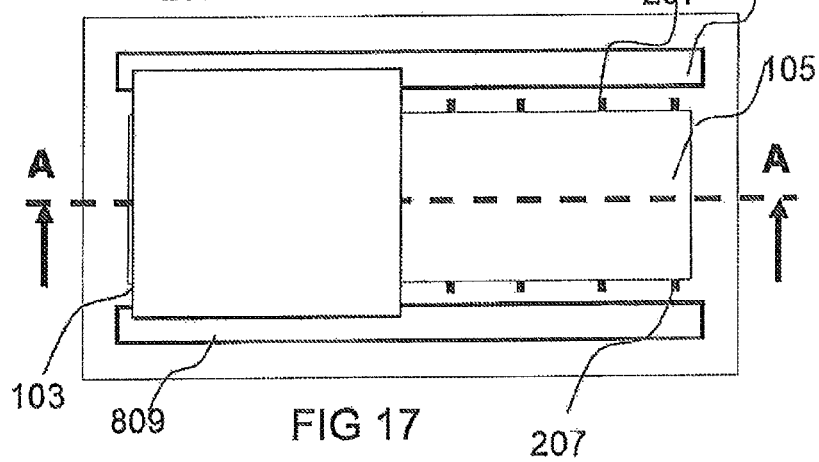

COOLING DEVICE FOR A BATTERY MODULE

This nonprovisional application is a continuation of International Application No. PCT/EP2010/068861, which was filed on Dec. 3, 2010, and which claims priority to German Patent Application No. DE 10 2009 058 070.0, which was filed in Germany on Dec. 14, 2009, and which are both herein incorporated by reference.

BACKGROUND OF THE INVENTION

1. Field of the Invention

The present invention relates to a cooling device for a battery module and to a battery device.

2. Description of the Background Art

High-performance energy storage devices such as, for example, Li-ion or NiMH accumulators or supercaps are used in modern hybrid electric and electric vehicles (HEV/EV) vehicles. Heating occurs in these during rapid charging and discharging due to resistances within and outside the cells. Temperatures above 50° C. damage the energy storage devices permanently. To assure the function of the energy storage devices, they must be actively cooled. For this purpose, the energy storage devices are brought into thermal contact with a special cooler. In other words, all cells should be at the same temperature level. The temperature level of the cells influences their lifetime and the output and thereby critically the lifetime of the entire battery.

For optimal operation of the cooling function, it is important that the cooler has a thermal contact as uniform as possible at each cell or each battery module. Among other things, a uniform pressing force is necessary for this. These pressing forces must also be present to a still sufficient extent years later with different vibrations, changes in load, material fatigue, temperature effects, subsidence phenomena, etc. Springs are often used structurally for this purpose.

Springs are used in this regard so that individual or a number of cooling plates or battery cells can be tensioned or pressed by means of a spring onto a cooling plate. DE 10 2009 058 070 A1, for example, describes a vertical bracing of a battery stack.

SUMMARY OF THE INVENTION

It is therefore an object of the present invention to provide an improved cooling device for a battery module and an improved battery device.

An embodiment of the present invention is based on the realization that springs can be used whose spring force is activated only by the installation of the cells or the modules themselves, in order to assure a lasting pressing force of a cooler on battery cells or battery modules. According to the invention, therefore, a switching spring system is used for battery cooling.

The approach of the invention can be used advantageously in particular when the battery cooler is difficult to access, for example, for reasons of installation space. This can be the case, for example, when the battery cooler is disposed in the bottom of a battery housing or behind the battery cells or battery modules. In such a case, there can be the problem during installation that the pressing force on the cooler must occur by means of the installation of the cells or modules, because the springs are no longer accessible after installation. The installation of the first module causes a change in the position of the cooler and thereby the tensioning of the spring or springs. Because not all cells or modules can be installed simultaneously, however, the problem arises during installation that the cooler is stressed by the spring forces in the area where the cells or modules, have still not been installed. The total pressing force of the springs acts here on the cooler itself and can damage it.

The installation problem can be solved by means of the approach of the invention by a switching spring.

This occurs in that the spring together with the cooler and spring seat is designed according to the invention so that it is not the change in position of the cooler that activates the spring force but the spring is tensioned by the installation of the cell or the battery module and thereby the spring force is built up. In the area where still no battery cell or no battery module has been installed, as a result the spring is loose and (still) applies no pressing force on the cooler.

In this case, the springs can be made, for example, as leaf springs, disc springs, or wire springs, etc. The switching function can be carried out by the spring itself, therefore integrally. Alternatively, the switching function can be carried out by the spring and by additional ancillary components, e.g., levers or joints. The switching springs, instead of single parts, can also include a plurality of springs combined into a single component and be realized, for example, as a continuously produced leaf spring.

The present invention creates a cooling device for a battery module having the following features: a cooling element, which extends from a first side of the cooling element, said side facing the battery module, to an opposite second side of the cooling element; and at least one spring element, which is disposed on the second side of the cooling element, in order to exert a pressing force on the second side of the cooling element in a tensioned state; and at least one tensioning device, which is coupled to the spring element and whereby a contact region of the tensioning device extends beyond the second side of the cooling element, when the spring element is in a relaxed state.

The battery module can be an energy storage device, such as, for example, a Li-ion or an NiMH accumulator or a supercap. The battery module can comprise a battery cell or a plurality of battery cells. The cooling element can be a cooling plate, which to cool the battery module can lie against a surface of the battery module. The cooling element can include a good heat-conducting material, for example, metal. The spring element can be made as a spring whose spring force in the tensioned state acts on the cooling element so that the cooling element is pressed against the battery module. The tensioning element can be a rigid lever, whose one end is coupled to the spring element and can tension the spring element and whose other end can be moved by the battery module, when the battery module approaches the cooling element. When the battery module lies against the cooling element, the tensioning element can be pressed by the battery module into the through hole. In this state, the spring force of the spring element can be maximal.

Accordingly, the tensioning device can be designed to increase a spring tension of the spring element, when the contact region of the tensioning device is moved in the direction of the second side. The contact region of the tensioning device in so doing can be moved by the battery module, which can be placed on the cooling element during installation.

For this purpose, the contact region can be designed to abut against the battery module and to be pressed by the battery module toward the second side, when the battery module is made to approach the first side of the cooling element. The contact region can be rounded off to slide along the surface of the battery module during its approach and to prevent snagging.

According to an embodiment, the tensioning device can be formed from an end region of the spring element. The tensioning device and spring element can thus be formed from a single part.

Alternatively, the tensioning device can be connected via a joint with the spring element. This can improve, for example, the tensioning behavior.

The spring element can be made as a leaf spring, disc spring, or wire spring. The type of spring can be selected depending on the necessary pressing force and the available installation space. Different types of springs can also be combined.

The spring element can have at least one first contact region to the second side of the cooling element and at least one second contact region to a battery housing, in which the cooling element can be disposed. Thus, the spring element can be disposed between the battery housing and the cooling element. Accordingly, a force opposing the pressing force can be applied to the battery housing.

The cooling element can have a through hole, particularly a plurality of through holes. In this case, the tensioning device can extend through at least one through hole or the cooling device can have a number of tensioning devices corresponding to the plurality of through holes. The through holes can be arranged distributed over the cooling element. In particular, the through holes can be arranged in an area of the cooling element, where the cooling element is adjacent to the battery module(s).

In this case, the cooling device can have a number of spring elements corresponding to the plurality of through holes. Thus, a tensioning device can be assigned to each through hole and a spring element to each tensioning device.

Alternatively, the at least one spring element can extend over an area of the cooling element, which comprises a number or all of the plurality of through holes. For example, a single spring element can be provided, which extends over the cooling element area provided with through holes.

The cooling element can be designed as a cooling plate, which due to the pressing force is pressed against one or a plurality of battery modules. In this regard, this can be a conventional cooling plate, which is already used for dissipating the heat of energy storage devices.

The present invention provides further a battery device including a battery housing; and a cooling device, which is disposed in the battery housing so that the at least one spring element is disposed between an inner wall of the battery housing and the cooling element. The battery housing can have a bottom element and wall elements. The cooling device can be disposed on the bottom element.

The battery device can have at least one battery module, which is disposed adjacent to the first side of the cooling element in the battery housing. Thus, the battery module can be placed on the cooling device and upon approaching the cooling device activate the tensioning elements and thereby tension the spring elements.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 15 shows a detail illustration of the battery device of the invention;
FIG. 16 shows a sectional view of the battery device of the invention;
FIG. 17 shows an illustration of a battery device of the invention.

DETAILED DESCRIPTION

Figure 1:
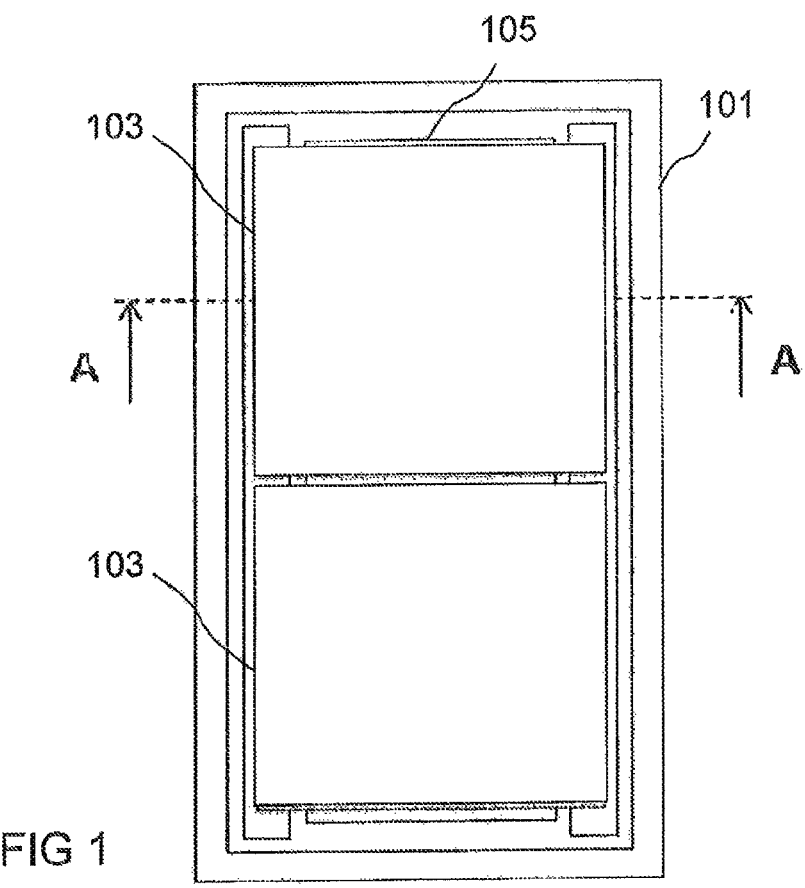
FIG. 1 shows an illustration of a battery device.

In the following description of the exemplary embodiments of the present invention, the same or similar reference characters are used for the elements with a similar action and shown in the different drawings, whereby a repeated description of these elements is omitted.

FIG. 1 shows a plan view of a battery device. The battery device has a battery housing 101 and two battery modules 103, which are arranged next to one another in housing 101. A cooling element 105 extends below battery modules 103 within battery housing 101. A section line A-A is shown as well.

Figure 2:
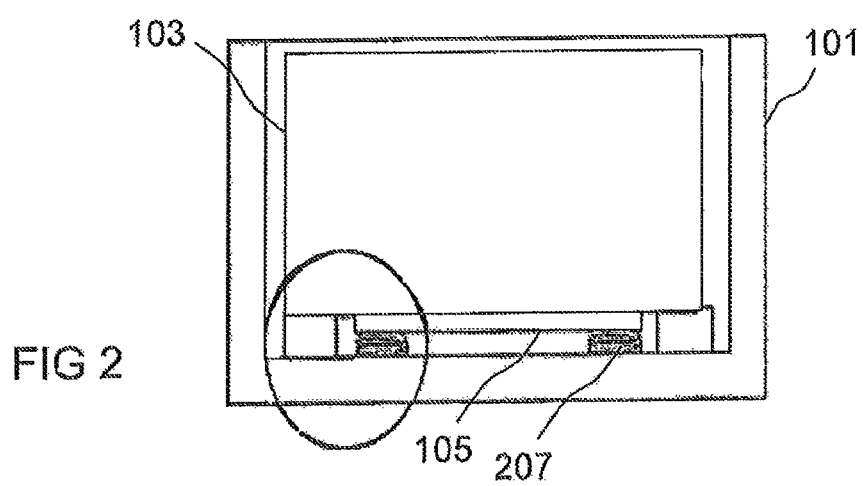
FIG. 2 shows a sectional view of the battery device.
Figure 3:
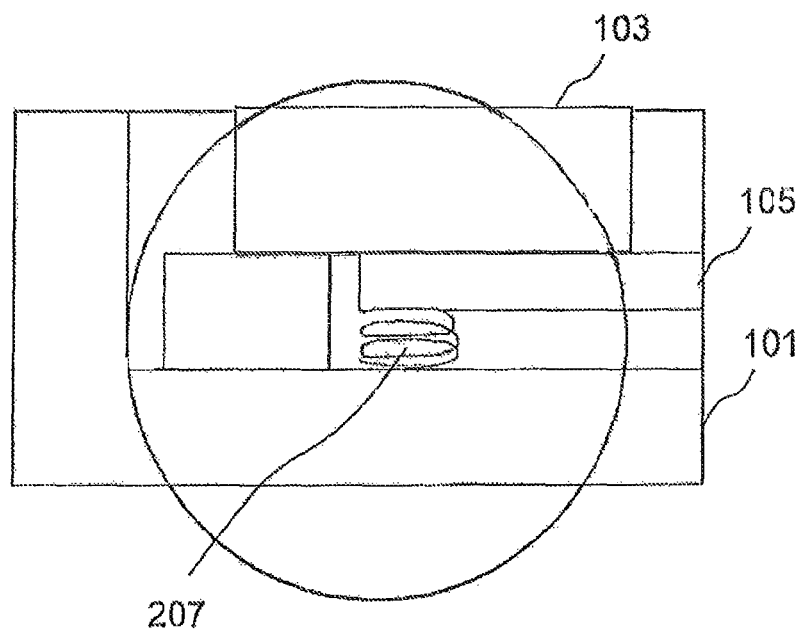
FIG. 3 shows a detail illustration of the battery device.

FIG. 2 shows a sectional view through the battery device shown in FIG. 1 along section line A-A. Shown is battery housing 101 with a bottom element and two side elements, as well as battery module 103, which is disposed in housing 101 on stops. Cooling element 105 lies against a bottom side of battery module 103. Cooling element 105 is pressed by means of springs 207 against battery module 103. Thus, a spring 207 presses cooling element 105 against battery module 103.

FIGS. 3 to 7 show an installation of battery modules 103.

Figure 4:
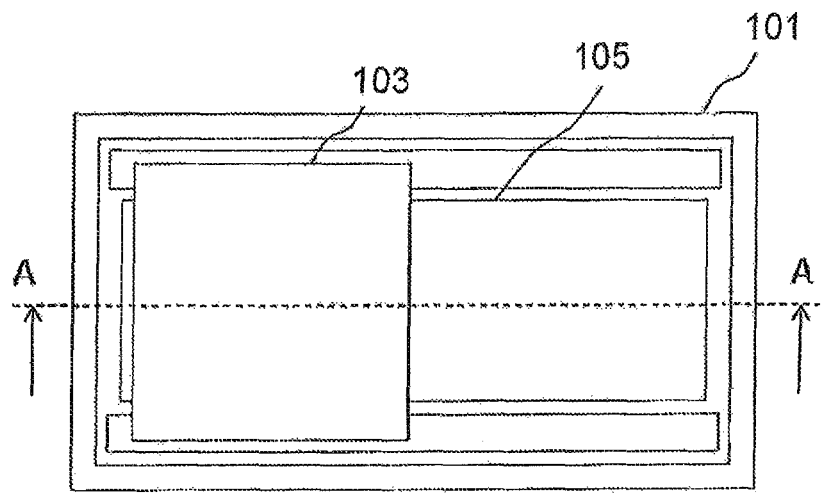
FIG. 4 shows another illustration of a battery device.

FIG. 4 shows a plan view of the battery device. The battery device has battery housing 101 and in this case a battery module 103, which is disposed in housing 101. Cooling element 105 is disposed in battery housing 101. Further, a section line A-A is shown.

Figure 5:
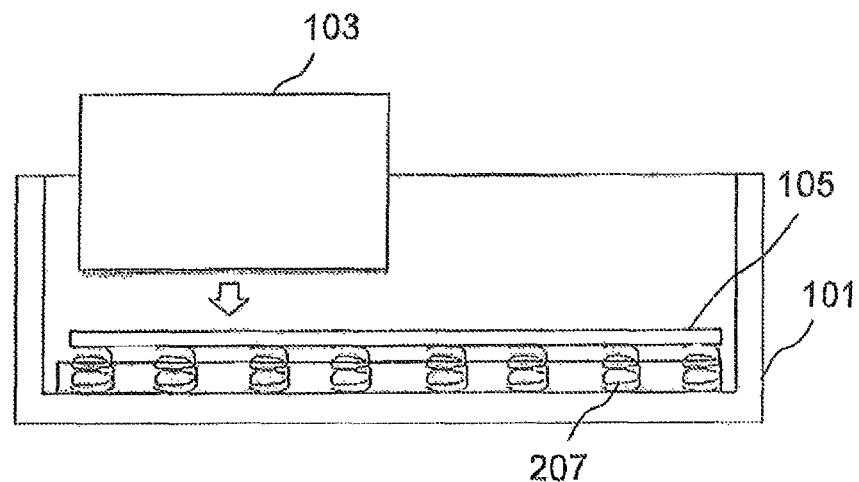
FIG. 5 shows a sectional view of the battery device.

FIG. 5 shows a sectional view through the battery device shown in FIG. 4 along section line A-A. Shown is battery housing 101 with cooling element 105, which is held by means of a plurality of springs 207. Battery module 103 is inserted into battery housing 101 in the direction indicated by an arrow and placed on cooling element 105.

During installation, in a first step only cooling element 105 is disposed in battery housing 101. No battery module 103 is installed as yet. Springs 207 which are intended to press cooling element 105 against modules 103 are relaxed, and the spring path is maximal. As a result, cooling element 105 protrudes beyond the intended end position.

Figure 6:
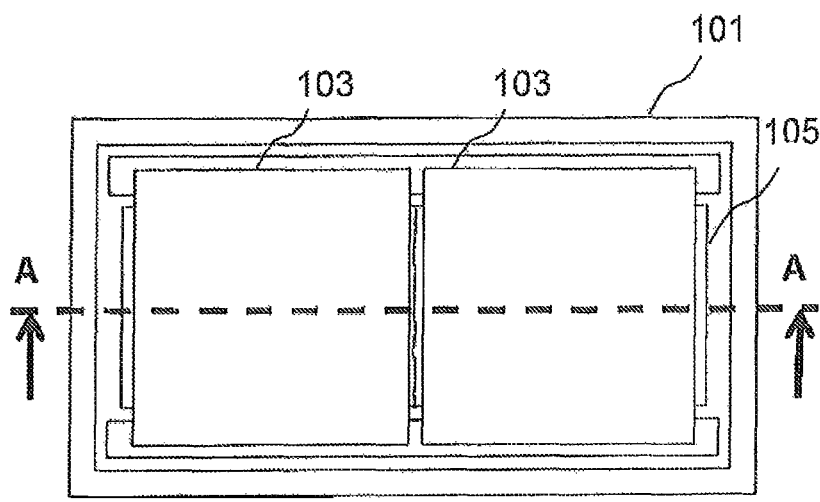
FIG. 6 shows another illustration of a battery device.

FIG. 6 shows a plan view of the battery device shown in FIG. 4. The battery device has a second battery module 103 that is to be installed beside the already installed first battery module 103. Section line A-A is again shown.

Figure 7:
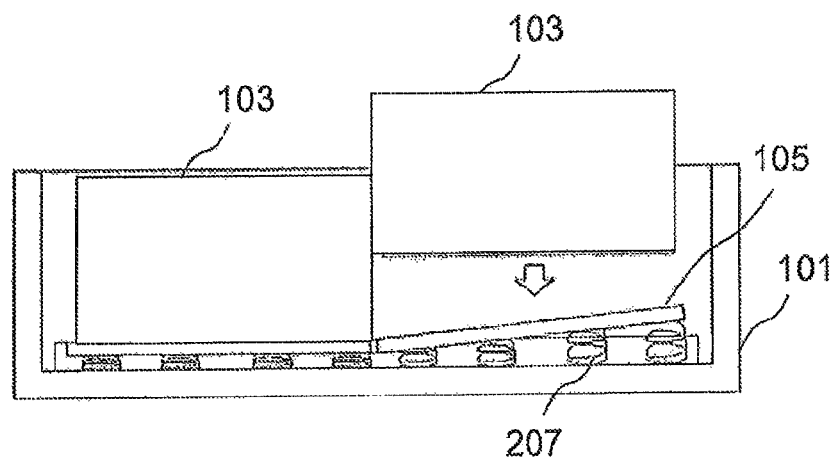
FIG. 7 shows a sectional view of the battery device.

FIG. 7 shows a sectional view through the battery device shown in FIG. 6 along section line A-A. Shown is battery housing 101 with cooling element 105, on which a battery module 103 is already installed. A second battery module 103 is inserted into battery housing 101 in the direction indicated by an arrow and placed on cooling element 105.

In a second step of the installation, battery module 103, which has been installed first, presses cooling element 105 with springs 207 into the intended installation position. The end position of battery module 103 is predetermined by the housing, e.g., by the geometric stops and screw connections. Springs 207 press cooling element 105 against battery module 103 to assure the thermal contact permanently.

Cooling element 105 is stressed by spring forces in the area where the cells or modules 103 are not yet installed. The total pressing force of springs 207 acts here on cooling element 105 itself and can damage it.

FIGS. 8 to 13 show a solution according to the invention with the use of a switching spring system.

Figure 8:
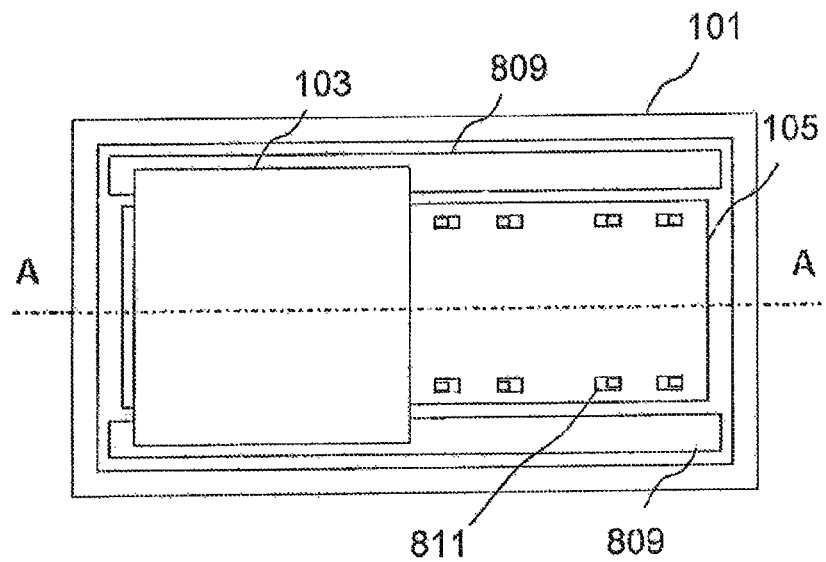
FIG. 8 shows an illustration of a battery device of the invention.

FIG. 8 shows a plan view of a battery device, according to an exemplary embodiment of the present invention. The battery device has a battery housing 101 and a battery module 103, which is disposed in housing 101. A cooling element 105 extends under battery module 103 within battery housing 101. Battery housing 101 is rectangular in shape. Two stops 809, on which edge regions of battery module 103 can be placed, are disposed in the interior along the long sides at the bottom of battery housing 101. Thus, battery module 103 is supported by stops 809. Cooling element 105 is disposed between stops 809. A surface of the cooling element facing battery module 103 can be seen. Cooling element 105 can be designed as a cooling plate. The cooling element has a plurality of holes 811. According to this exemplary embodiment, holes 811 are arranged in two rows along the long sides of cooling element 105. Holes 811 are rectangular in shape. A tensioning device extends through each of holes 811. A section line A-A is shown also.

Figure 9:
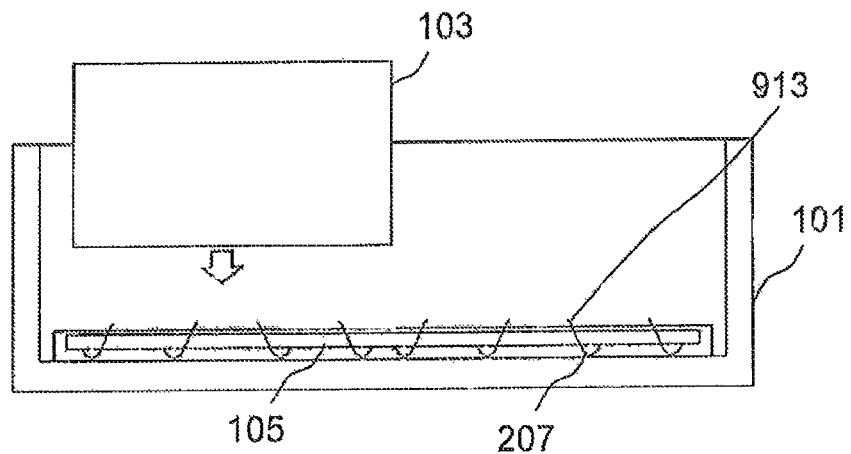
FIG. 9 shows a sectional view of the battery device of the invention.

FIG. 9 shows a sectional view through the battery device shown in FIG. 8 along section line A-A. Shown is battery housing 101 with cooling element 105, which is held by means of a plurality of spring elements 207. Spring elements 207 are disposed between the bottom of battery housing 101 and cooling element 105. The cooling element can be pressed by means of spring elements 207 away from the bottom of battery housing 101 in the direction of battery module 103, which is inserted into battery housing 101 in the direction indicated by an arrow and in the inserted state is placed on cooling element 105. Spring elements 207 each have a tensioning element 913, which in each case is passed through one of the holes of the cooling element. Each of the tensioning elements 913 protrude over a surface of cooling element 105, said surface facing battery module 103. Before battery module 103 is placed on cooling element 105, it is placed on the projecting end areas of tensioning elements 913 and with a further approaching of cooling element 105 press these into the holes of cooling element 105. The change effected thereby in the position of tensioning elements 913 causes a tensioning of springs 207. The spring force of springs 207 increases through their tensioning as a result of which cooling element 105 is pressed with a predetermined force against battery module 103 and held there. According to this exemplary embodiment, spring elements 207 and tensioning elements 913 assigned to one another are each made of a single piece. For example, to this end a spring steel band or spring steel wire can be bent into a semicircular shape at one end and have a straight piece at the other end, which protrudes obliquely from the bent piece. Spring element 207 can be formed by the bent piece and tensioning element 913 by the straight piece.

In the first installation step shown, only cooling element 105 is in battery housing 101. No battery module 103 has been installed as yet. In the uninstalled state, springs 207 are relaxed and the spring path is maximal.

Cooling element 105 lies just below its intended installation position. A part 913 of each spring 207 protrudes on the side, where battery modules 103 are to be installed, somewhat over cooler 105 (and the installation position).

Figure 10:
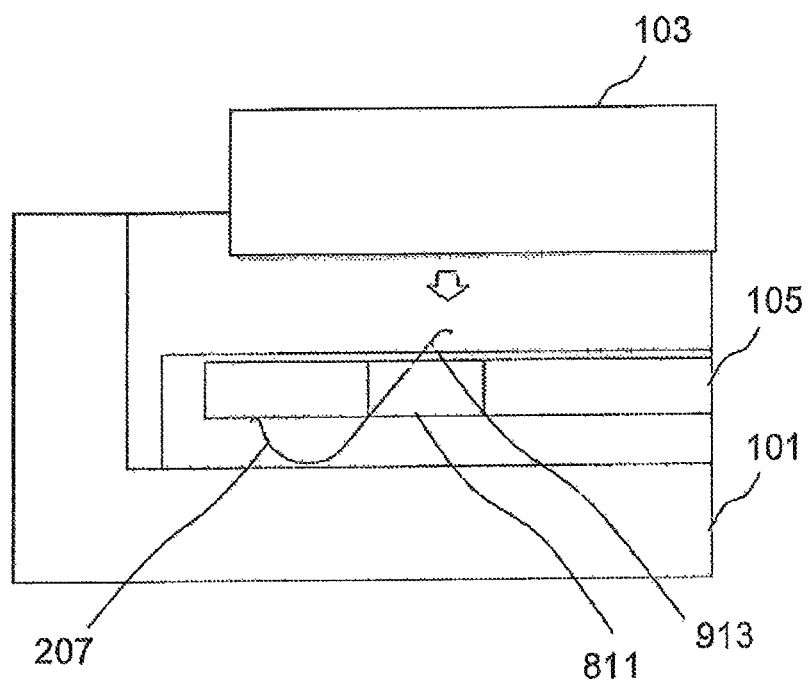
FIG. 10 shows a detail illustration of the battery device of the invention.

FIG. 10 shows a detail illustration of a section of the battery device shown in FIG. 9. Shown is a spring 207 with a tensioning element 913, which is passed through a recess or a break 811 of cooling element 105.

In the uninstalled state, spring 207 is relaxed. Cooling element 105 lies just below its intended installation position. A part of spring 207 protrudes on the side where battery modules 103 are to be installed somewhat over cooling element 105.

Figure 11:
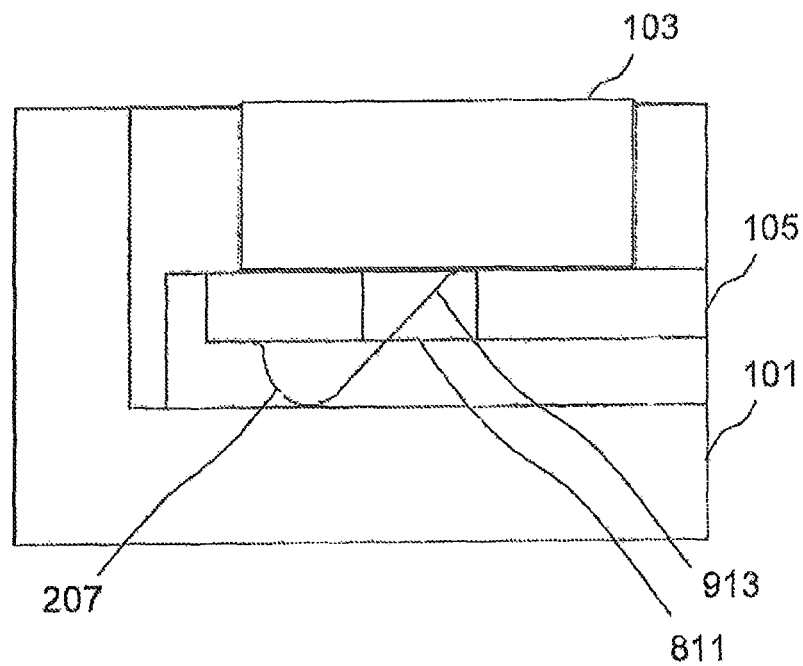
FIG. 11 shows another detail illustration of the battery device of the invention.

FIG. 11 shows the detail illustration shown in FIG. 10, whereby battery module 103 now lies on cooling element 105. Tensioning element 913 is pressed by battery module 103 into recess 811 and held there. As a result, spring 207 is tensioned and presses with an end opposite to tensioning element 913 against the bottom side of cooling element 105.

In the shown second step, the protruding part of spring 207 is pressed down by the installation of the battery module, as a result of which spring 207 is tensioned and cooling element 105 is pressed in this area against module 103.

Figure 12:
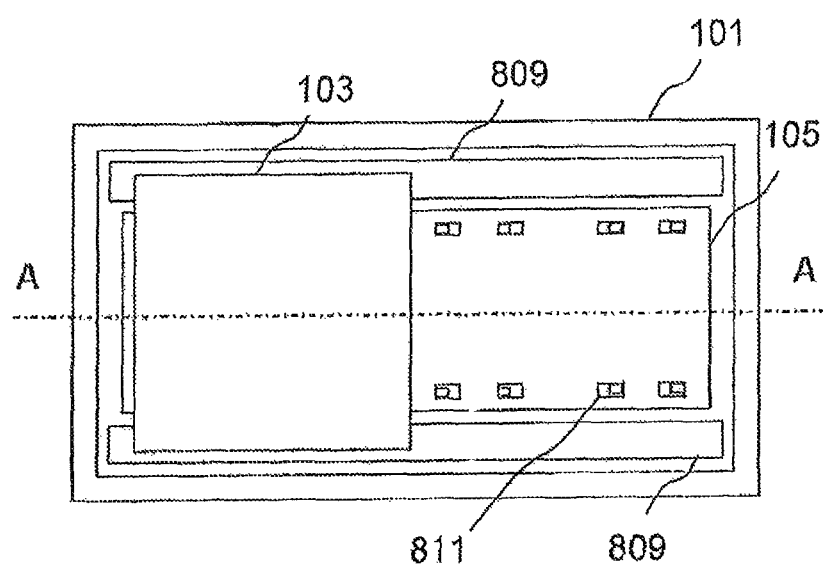
FIG. 12 shows an illustration of a battery device of the invention.

FIG. 12 shows a plan view of a battery device, according to an exemplary embodiment of the present invention. The battery device corresponds to the device shown in FIG. 8. Section line A-A is shown again.

Figure 13:
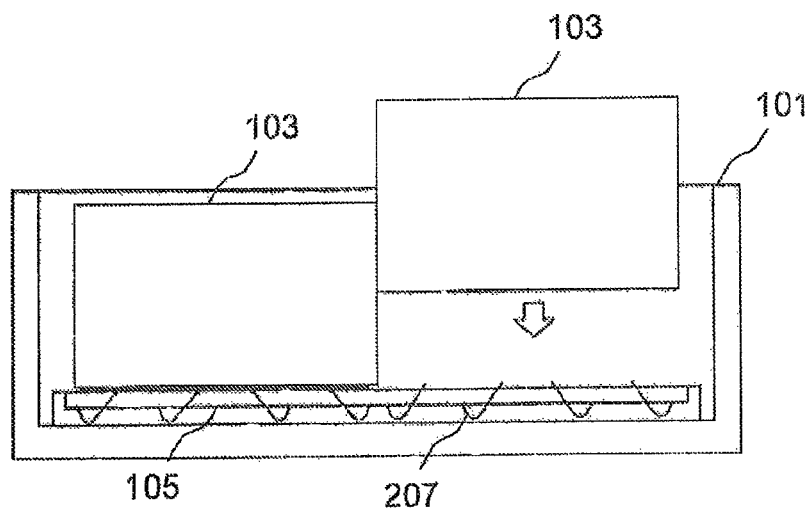
FIG. 13 shows a sectional view of the battery device of the invention.

FIG. 13 shows a sectional view through the battery device shown in FIG. 12 along section line A-A. Shown is battery housing 101 with a first battery module 103, which already lies on cooling element 105. A second battery module 103 is inserted into battery housing 101 next to first battery module 103 in the direction indicated by an arrow.

In the shown second installation step, battery module 103, which is installed first, tensions springs 207 in its installation area itself. Springs 207 are still relaxed in the rest of cooling element 105.

The end position of battery module 103 is predetermined by housing 101, e.g., by the geometric stops and screw connections. Springs 207 press cooling element 105 against battery module 103 to permanently assure the thermal contact.

This results in the advantage that cooling element 105 does not cause stress by the spring forces in the area where cells or modules 103 are not yet installed.

The described exemplary embodiments are selected only by way of example and can be combined with one another.

Figure 14:
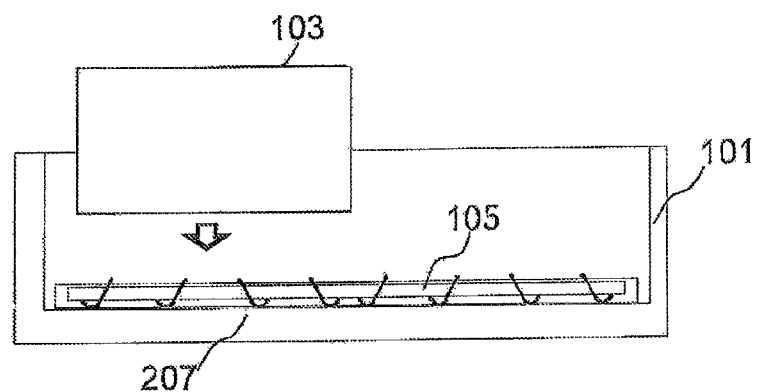
FIG. 14 shows a sectional view of the battery device of the invention.

Another exemplary embodiment of the battery device of the invention is shown in FIGS. 14 and 15. Shown in FIG. 14 is the additional exemplary embodiment of the battery device of the invention in a sectional view, while battery module 103 is inserted in the direction of the arrow. FIG. 15 shows the battery device of FIG. 14 in a top plan view, when battery module 103 is placed in the battery device. It is to be seen in this case that springs 207 with tensioning units 913 are now no longer passed through the through holes, but cooling element 105 has recesses 811 at its edge. Springs 207 are inserted through these recesses 811, so that tensioning units 913 protrude over cooling element 105 in the direction of battery module 103 to be inserted. In this way, the inventive approach to a solution can also be realized without the use of the through holes according to FIGS. 8 to 13. In such an exemplary embodiment, a suitable support for spring elements 207 (for example, in the form of a joint mount at the bottom of housing 101) should be assured, so that spring elements 207 should not slip out of recesses 811 during insertion of battery module 103.

Figure 18:
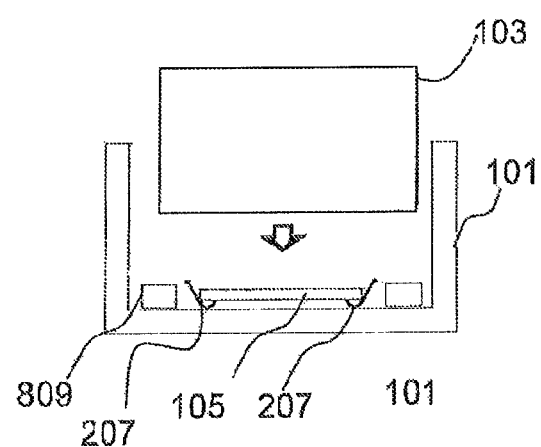
FIG. 18 shows a sectional view of a battery device of the invention.

Alternatively, spring elements 207 can also be arranged next to cooling element 105, as is realized in the exemplary embodiment of the invention according to FIGS. 16 to 18. In FIG. 16, the additional exemplary embodiment of the invention is reproduced as a sectional illustration, whereby the insertion of battery module 103 occurs in the direction of the arrow. Here, it is now evident that springs 207 with the tensioning units protrude over the cooler over the side that after insertion of the battery module faces said battery module 103. A top plan view of this additional exemplary embodiment with inserted battery module 103 is shown in FIG. 17, whereby it is now also evident that springs 207 are arranged to the side, i.e., between cooling element 105 and one of the stops 809. In this case as well, a suitable support of spring elements 207 to prevent falling out in the non-tensioned state should be assured. A section line A-A, which forms the section direction for the illustration of FIG. 16, is shown further in FIG. 17.

A sectional view of the additional exemplary embodiment is reproduced in FIG. 18, whereby a section through the battery device is depicted at right angles to the line A-A in FIG. 17. It is now clearly evident in FIG. 18 that spring elements 207 are arranged between cooling element 105 and one of the stops 809. To achieve a secure pressing of cooling element 105 against battery module 103, springs 207 are arranged not only between cooling element 105 and one of stops 809, but a specific number of springs is placed between each of the opposite stops 809 and cooler 105, so that cooling element 105 can be pressed by bilateral uniform pressing pressure against battery module 103. This assures a good and extensive thermal contact and reduces a nonuniform stress on cooling element 105.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A battery device, comprising:
   a battery housing;
   a battery module disposed within the battery housing; and
   a cooling device for the battery module, the cooling device disposed within the battery housing and comprising:
      a cooling element configured to extend from a first side of the cooling element to an opposite second side of the cooling element, the first side facing the battery module;
      at least one spring element arranged on the second side of the cooling element and configured to exert a pressing force on the second side of the cooling element in a tensioned state to press the cooling element against the battery module; and
      at least one tensioning device coupled to the spring element, wherein a contact region of the tensioning device extends beyond the second side of the cooling element when the spring element is in a relaxed state,
   wherein the tensioning device has a first end connected to and extending from an end region of the spring element and a second end abutting against the battery module,
   wherein the cooling element has one or more through holes, and
   wherein the tensioning device extends through the one or more through holes.

2. the cooling device according to claim 1, wherein the tensioning device is configured to increase a spring tension of the spring element when the contact region of the tensioning device is moved in the direction of the second side.

3. The cooling device according to claim 1, wherein the contact region is configured to abut against the battery module and is configured to be pressed by the battery module toward the second side when the battery module is made to approach the first side of the cooling element.

4. The cooling device according to claim 1, wherein the spring element has at least one first contact region to the second side of the cooling element and at least one second contact region to a battery housing in which the cooling element is arranged.

5. A cooling device for a battery module, the cooling device comprising:
   a cooling element configured to extend from a first side of the cooling element to an opposite second side of the cooling element, the first side facing the battery module;
   at least one spring element arranged on the second side of the cooling element and configured to exert a pressing force on the second side of the cooling element in a tensioned state; and
   at least one tensioning device coupled to the spring element, wherein a contact region of the tensioning device extends beyond the second side of the cooling element when the spring element is in a relaxed state,
   wherein the cooling element has at least one through hole or a plurality of through holes, and wherein the tensioning device extends through at least one through hole or the cooling device has a plurality of tensioning devices corresponding to the plurality of through holes.

6. the cooling device according to claim 5, further comprising a plurality of spring elements corresponding to the plurality of through holes.

7. the cooling device according to claim 5, wherein the at least one spring element extends over an area of the cooling element, which comprises a number or all of the plurality of through holes.

8. The battery according to claim 1, wherein the cooling device has a plurality of tensioning devices corresponding to the one or more through holes.

9. The battery device according to claim 1, further comprising a plurality of spring elements corresponding to the one or more through holes.

10. The battery device according to claim 1, wherein the at least one spring element extends over one of the through holes.

* * * * *